Dec. 24, 1963 R. C. GIESSE 3,115,459
FILTER
Filed May 25, 1961
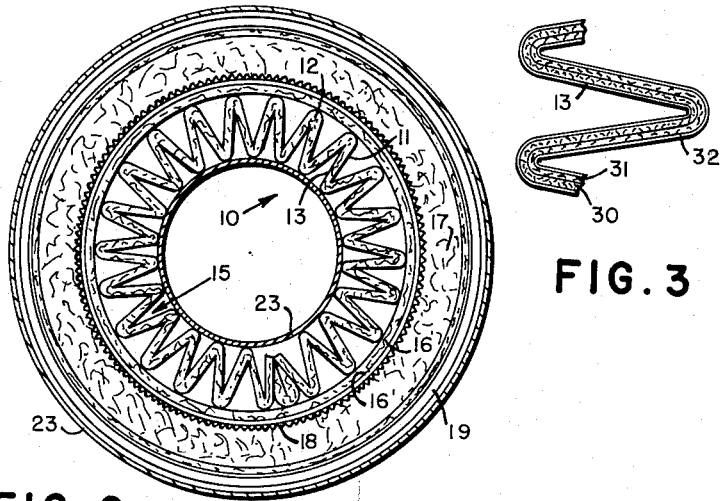
FIG. 3
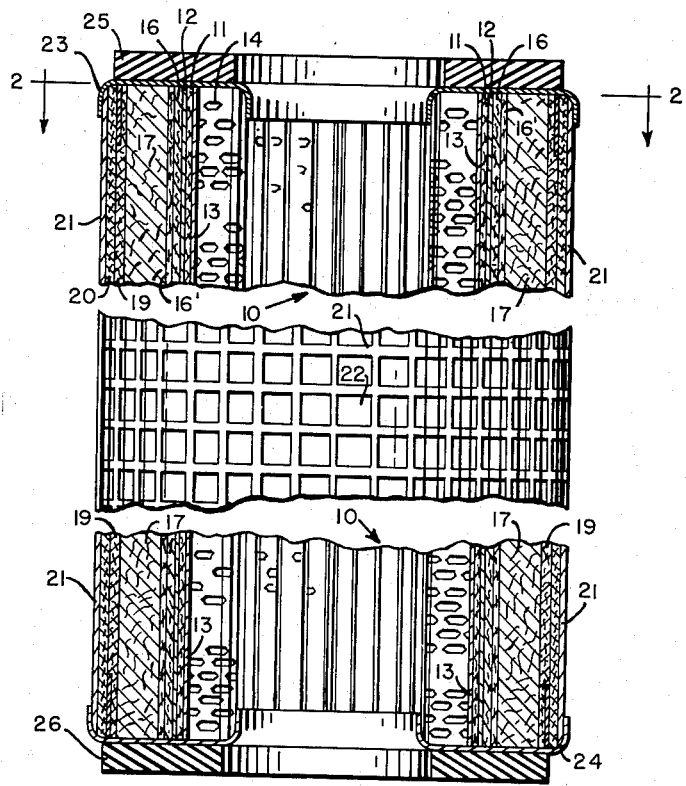
FIG. 2
FIG. 1
INVENTOR.
ROBERT C. GIESSE
BY
Robertson & Smythe
ATTORNEYS

United States Patent Office 3,115,459
Patented Dec. 24, 1963

3,115,459
FILTER
Robert C. Giesse, Bettendorf, Iowa, assignor to Ametek, Inc., a corporation of Delaware
Filed May 25, 1961, Ser. No. 112,730
6 Claims. (Cl. 210—484)

The present invention relates to filters for handling an admixture of a multi-phase system which may include a solid phase, and polar and nonpolar liquid phases of different densities, and particularly to a new and improved filter cartridge for such filters.

In the fueling of certain aircraft, liquid fuel often includes solid foreign matter and water which latter may occur as an admixture with the liquid fuel and be present by virtue of condensation or otherwise. These fuels often contain many additives, such as dimethylhydrazine, carbonates and sulphates, for imparting operating and storage characteristics to the fuel.

It has previously been proposed to employ resin-impregnated glass wool as a filtering medium, and although this is moderately satisfactory in filtering of certain liquid fuels so long as the flow rate and the moisture content are low, it has proven unsatisfactory where the moisture content is high and is wholly ineffective for certain other liquid fuels such as the high additive fuels above referred to regardless of the water content.

The principal object of the invention is to provide a replaceable cartridge for a filtering apparatus employed in the removal of solids and/or a polar liquid as a discontinuous phase from a nonpolar liquid continuous phase of different density within an admixture of said phases.

Another object of the invention is to provide a filter cartridge for filtering liquid fuels in which solid foreign matter from sub-micron size and larger, and all free water are removed from regular and high additive liquid fuels.

In one aspect of the invention, the filter cartridge may comprise a central core that may be a laminated construction of die-slitted aluminum sheets that have been flattened by a calendering process, and a layer of fiber glass. Preferably, but not essentially, a layer of fiber glass is laminated with a sheet of the flattened die-slitted aluminum. The lamination may then be passed through a pleating machine. With the pleats arranged longitudinally, an inner core then can be produced by forming the pleated laminate into a tube. As the admixture passes transversely through this pleated tubular construction, a filter cake builds up on the inner surfaces of the aluminum sheet through which the admixture is required to pass, thereby eliminating large particles of solids within the admixture. Further, by use of a laminate of various materials in conjunction with the metal core, it is possible to obtain selective filtration through the pleated sandwich and such will govern the degree of filtration.

In another aspect of the invention, the outer periphery of the pleated tubular laminate may be surrounded with a layer of fiber glass and a knitted stocking may surround this layer of fiber glass to prevent its migration. This layer of fiber glass may be utilized to further remove solid particles from the admixture as it passes transversely through the filter cartridge. Further, the pleated laminate may be composed of a fibrous mat such as nylon felt and a sheet of "Nalcon" paper, such being made of polyethylene coated cellulose fibers.

In still another aspect of the invention, an outer core of compressed, coated natural or synthetic fibers may surround the last mentioned layer of fiber glass, and its primary purpose is to cause the polar liquid within the admixture to coalesce as the admixture passes transversely through the layer of coated fibers making up the core.

In still another aspect of the invention, an outer layer of fiber glass or paper may surround the outer core, and it picks up sub-micronic particles passing through the outer core. An outer knitted stocking may surround the outer layer of fiber glass or paper, and an outer perforated metal retainer may encase the assemblage with top and bottom perforated end cap members.

Preferably, the fibers of the outer core are coated (not impregnated) with either branch or linear polyethylene. Polyethylene is the generic term applied to a basic plastic resin made from monomer ethylene gas. Its molecular structure is essentially a long straight chain paraffin. Typical of paraffin structures, polyethylene is chemically inert in most environments and is thermoplastic.

Regular (branch) polyethylene is polymerized at high pressures and temperatures. The resulting polyethylene structure is a long chain with many alkyl or vinyl structures branching from the main trunk of its molecular chain. This branching in the otherwise linear chain is important to some of the desirable properties of regular polyethylene, such as impact strength.

Catalytic (linear) polyethylene is polymerized with the aid of a catalyst under milder conditions of pressure and temperature. The resulting structure is a long chain with an orderly molecular arrangement with small discontinuities and little branching.

Polyethylene exhibits an amorphous-crystalline structure. Branch polyethylene is about 60% crystalline, and linear polyethylene is more than 90% crystalline at room temperature. Increased crystallinity gives higher tensile strength, lower permeability and lower elongation physical characteristics.

It has been found that the process of coating fibers with polyethylene by direct polymerization of the polyethylene structure or the base fiber generates a film of polyethylene on the fiber base material. Approximately 10–15% polyethylene content results in a thin uniform film over the fiber surface. On increasing the polyethylene content up to about 50% (not limiting), the polymer continues to grow. The continued growth, however, adds very little to the film thickness, but instead produces a peculiar "knob-like" growth that mushrooms from many points on the coated fiber surface. When coated fibers having this particular conformation of polyethylene, developed by coating some base material, are employed as filter media, a superior filter element having a coalescing characteristic is produced.

The above, other objects and novel features of the invention will become apparent from the following specification and accompanying drawings which are merely exemplary.

In the drawings.

FIG. 1 is a partial sectional elevational view of a filtering cartridge to which the principles of the invention have been applied;

FIG. 2 is a partial sectional view taken substantially along line 2—2 of FIG. 1; and FIG. 3 is a broken section showing another form of the pleated laminate or sandwich.

Referring to FIG. 1, the principles of the invention are shown as applied to a cartridge including an inner retainer core 10. The core 10 may comprise a laminated construction including perforated metallic sheeting and fiber glass. In the embodiment disclosed, a layer of fiber glass 11 is sandwiched between two sheets of aluminum 12 and 13. Additionally, as seen in FIG. 3, the laminate may be composed of one sheet of aluminum 13 as described hereafter, a fibrous mat 30 of a substance such as nylon felt, a layer 31 of 1-micron fiber glass, and a sheet 32 of paper such as made from polyethylene coated fibers. While two sheets of aluminum have been shown and will be described, it is to be understood that one sheet of aluminum and a layer of fiber glass may suffice under certain circumstances.

The sheets of aluminum may be die-slitted, forming through openings 14 over their entire surfaces that may resemble, to a degree, conventional expanded metal, although not formed in the known manner of forming expanded metal. The openings 14 may be surrounded by sharp ridges which, if retained, would tend to cut the fiber glass laminate. Accordingly, the die-slitted aluminum sheets may be passed through calendering rolls to flatten all edges about the openings 14 into a single plane.

With a layer of phenolic impregnated fiber glass having about one micron diameter fibers, between two sheets of the flattened, pierced aluminum sheets, pressure may be applied, compressing the fiber glass and sheets into a laminated construction of about one-eighth of an inch. The phenolic impregnation may be omitted. The laminated structure may then be run through a pleating machine, forming pleats 15 as shown in FIG. 2. The pleated laminated structure may then be formed into a tube, producing the inner core 10.

Surrounding the outer periphery of the core 10 may be a layer 16 of one micron, phenolic impregnated fiber glass, it being possible to omit the phenolic resin. A stocking 16' of loosely knit fabric may surround the layer 16 to prevent migration of the fiber glass of layer 16.

Surrounding the exterior of the laminated layer 16 may be a substantially thick annular layer or core 17 of material that tends to cause water within the fuel to coalesce. The annular layer or core 17 may be made from natural or synthetic fibers, either woven or nonwoven, and coated with polyethylene to produce the peculiar "knob-like" growth previously described. Furthermore, the annular layer 17 might involve the above referred to process followed by digestion and leaching of the base fiber, leaving a pure polyethylene core having essentially the peculiar "knob-like" configuration. Additionally, such layer 17 may involve coating relatively soluble material such as sodium chloride crystals of some particular desired particle size that can be easily washed out after having been coated, formed and set.

In addition, the action of the core 17 may be varied by shifting certain physical properties such as increasing or decreasing the polyethylene content which may result in more or less growth of the "knob-like" structure which could effect changes in density, compressibility and porosity; and varying the base material coated with the polyethylene, resulting in changing the characteristics of the coating structure, thereby controlling the liquid-solid retention of the core, varying the porosity as well as the pressure drop through the core and also altering its surface activity.

It has been found that relatively short cellulose fibers that have been coated with polyethylene are particularly satisfactory to cause any water within the fuel to coalesce and form droplets. One particularly good short length cellulose fiber, which is known in the trade as "Solka-Floc BW40," when coated with polyethylene, produces remarkable results. It has a fiber length in the neighborhood of between 20-100 microns. Another short cellulose fiber coated with polyethylene is known in the trade as "Nalcon," manufactured by The National Lead Corporation.

The formed tubular core 17 of coated fibers may then be placed between perforated metal retainers and heatset by placing the assembly into a jig or clamp. The heatsetting operation may be for about three hours at about 115° C. and if the core is not restrained, it will expand on heating. Of course, the time-temperature relationship may be varied by decreasing the time and increasing the temperature, or vice versa.

The heat-setting operation provides a stable core in which the polyethylene, when heated, softens and mechanically bonds polyethylene film to polyethylene film as these surfaces contact each other, does not diminish the porosity of the core, and maintains a maximum of surface area of polyethylene.

While the core 17 may be formed in the above described manner, it may be formed by first making sheets of polyethylene coated material that may or may not be preset by vacuum deposition, preweaving, gravity deposition, heat- or pressure-setting, and then wrapped spirally or cylindrically in one or more layers and then finally heat-set.

While coated "Solka Floc" and "Nalcon" fibers have been extremely satisfactory, it is to be understood that the core 17 may also be made from other polyethylene coated fibers or related materials preformed and heat-set as membranes wrapped or otherwise formed into a core of one or more layers. Furthermore, the inner periphery of the core 17 may be corrugated by either forming longitudinal ridges 18, horizontal ridges, spiral ridges or a combination of such ridges.

Surrounding the core 17 may be a layer 19 of phenolic-impregnated glass fibers of a diameter in the order of about one micron. A sock 20 of a relatively loosely woven fabric may surround the layer 19 to permit free passage of liquid and tending to inhibit the migration of the fibers of layer 19.

An outer retainer 21 may surround the assembled elements 10, 16, 16', 17, 19 and 20. The retainer 21 preferably is made of a coarse screen-like metallic material which may be coated and provides apertures 22 therethrough. End caps 23 and 24 may be attached to the top and bottom of the assembly, and they are preferably made of perforated or lanced sheet metal. Gaskets 25 and 26 may be located on the outer surfaces of the end caps 23 and 24 to provide proper sealing of the cartridge when assembled within a filter housing adapted to receive it.

From the foregoing it is evident that as the admixture passes transversely through the cartridge, a filter cake builds up on lanced calendered pleated sheet metal core 10. This causes removal of larger particles of foreign matter within the liquid being filtered. Those large particles that bleed through filter cake and lanced sheet metal of core 10 are picked up by fiber glass laminate 11. The inner layer 16 of fiber glass surrounding the laminated pleated construction acts also to remove additional large particles so that only the sub-micronic particles pass into the "Nalcon" core 17. The inner stocking 16' is to prevent migration of the fiber glass layer 16. This arrangement makes it possible to utilize the "Nalcon" core 17 primarily for coalescing the water within the fuel. The sub-micronic particles pass through the "Nalcon" core 17 and are picked up by a layer of "Nalcon" paper surrounding the core or by an outer layer of fiber glass 19 of one micron fibers.

The outer layer of fiber glass and outer stocking additionally act to assist the coalescing action.

Although the various features of the new and improved filter cartridge for filtering liquid fuel have been shown and described in detail to fully disclose one embodiment of the invention, it will be evident that numerous changes may be made in such details and certain features may be used without others without departing from the principles of the invention.

What is claimed is:
1. In a filter cartridge for filtering liquid fuel, an inner core for filtering substantially all particles from said fuel composed of pleated perforated sheet metal and fiber glass laminate in tubular form; and means for coalescing liquid within the substantially particle-free fuel including a tubular member surrounding said inner core and composed of fibers coated with polyethylene and having a knob-like surface structure.

2. In a filter cartridge for filtering liquid fuel, an inner core for filtering substantially all particles from said fuel composed of pleated, die-slitted, calendered sheet metal and phenolic impregnated fiber glass laminate in tubular form; and means for coalescing liquid within the substantially particle-free fuel including a tubular member surrounding said inner core and composed of fibers coated with polyethylene and having a knob-like surface structure.

3. In a filter cartridge for filtering liquid fuel, an inner core for filtering substantially all particles from said fuel composed of pleated perforated sheet metal and fiber glass laminate in tubular form; a tubular layer of fiber glass surrounding said inner core; means for coalescing liquid within the substantially particle-free fuel including a tubular member surrounding said tubular layer of fiber glass and composed of fibers coated with polyethylene and having a knob-like surface structure; an outer layer of fiber glass surrounding said tubular member; and a perforated metal retainer surrounding said outer layer of fiber glass.

4. In a filter cartridge for filtering liquid fuel, an inner core for filtering substantially all particles from said fuel composed of pleated perforated sheet metal and fiber glass laminate in tubular form; a tubular layer of fiber glass surrounding said inner core; a knitted fabric enclosure surrounding said layer of fiber glass; means for coalescing liquid within the substantially particle-free fuel including a tubular member surrounding said fabric and composed of fibers coated with polyethylene and having a knob-like surface structure; an outer layer of fiber glass surrounding said tubular member; an outer knitted fabric enclosure surrounding said outer layer of fiber glass; a perforated metal retainer surrounding said outer fabric; and perforated end cap members attached to said retainer.

5. A filter cartridge according to claim 1 wherein said tubular member has an inner peripheral ribbed surface.

6. A filter cartridge according to claim 3 wherein said tubular member has an inner peripheral ribbed surface.

References Cited in the file of this patent

UNITED STATES PATENTS

| | | |
|---|---|---|
| 1,565,988 | Cottrell | Dec. 15, 1925 |
| 2,732,077 | Robinson | Jan. 24, 1956 |
| 2,739,713 | Robinson | Mar. 27, 1956 |
| 2,827,395 | Jordan | Mar. 18, 1958 |
| 2,947,419 | Kasten | Aug. 2, 1960 |

FOREIGN PATENTS

| | | |
|---|---|---|
| 2,328 | Great Britain | 1858 |